US007844805B2

(12) United States Patent
Chang

(10) Patent No.: US 7,844,805 B2
(45) Date of Patent: Nov. 30, 2010

(54) PORTABLE PROCESSING DEVICE HAVING A MODEM SELECTIVELY COUPLED TO A RISC CORE OR A CISC CORE

(75) Inventor: Chi Chang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 828 days.

(21) Appl. No.: 11/758,772

(22) Filed: Jun. 6, 2007

(65) Prior Publication Data

US 2008/0052493 A1 Feb. 28, 2008

Related U.S. Application Data

(60) Provisional application No. 60/823,289, filed on Aug. 23, 2006.

(51) Int. Cl.
*G06F 7/38* (2006.01)
*G06F 9/00* (2006.01)
*G06F 9/44* (2006.01)
*G06F 15/00* (2006.01)

(52) U.S. Cl. .......................................... 712/229; 712/34

(58) Field of Classification Search .................. 712/34, 712/229

See application file for complete search history.

(56) References Cited

U.S. PATENT DOCUMENTS

| 6,976,180 B2 | 12/2005 | Cupps et al. | |
|---|---|---|---|
| 2003/0226044 A1* | 12/2003 | Cupps et al. | 713/300 |
| 2004/0142717 A1* | 7/2004 | Schmidt et al. | 455/550.1 |

FOREIGN PATENT DOCUMENTS

WO    WO2004064119    7/2004

\* cited by examiner

*Primary Examiner*—Eddie P Chan
*Assistant Examiner*—Corey Faherty
(74) *Attorney, Agent, or Firm*—James W. Huffman

(57) ABSTRACT

A processor for a portable electronic device. The processor includes a RISC (reduced instruction set computing) core a CISC (complex instruction set computing) core, a video accelerator circuit and an audio accelerator circuit. Each of the video and audio accelerator circuits are coupled to both the RISC and CISC cores, with both cores and both accelerator circuit being incorporated into a single integrated circuit. In a first plurality of operational modes, the RISC core is active, while the CISC core is in one of a sleep state or a power off state. In a second plurality of modes, both the RISC and CISC cores are active.

19 Claims, 3 Drawing Sheets

| Operational Mode | RISC | CISC | Audio/Video Accelerators | Display/Keyboard Control |
|---|---|---|---|---|
| Stand By | On | Off | Audio: Off, Video: On | RISC (MMI) |
| Voice Phone | On | Off or Sleep | Audio: On; Video: Off | RISC (MMI) |
| Image Phone | On | Off or Sleep | Audio On, Video: On | RISC (MMI) |
| Play MP3 | On | Off or Sleep | Audio: On; Video: Off | RISC (MMI) |
| Play DVB-H | On | Off | Audio: On, Video: On | RISC (MMI) |
| GPS | On | Off | Audio: Off, Video: On | RISC (MMI) |
| Phone Internet thru RISC | On | Off | Audio On, Video: On | RISC (MMI) |
| WLAN Internet thru RISC | On | Off | Audio On, Video: On | RISC (MMI) |
| Camera | On | Off or Sleep | Audio: Off, Video: Off | RISC (MMI) |
| Play Video | On | Off | Audio On, Video: On | RISC (MMI) |
| Phone Internet/email thru CISC | On | On | Audio On, Video: On | CISC (GUI) |
| WLAN Internet/email thru CISC | On | On | Audio On, Video: On | CISC (GUI) |
| Wi-Max | On | On | Audio On, Video: On | CISC (GUI) |
| Run CISC Apps (e.g. MS Word, MS Excel, PDF, play video, etc) | On | On | Audio On, Video: On | CISC (GUI) |

Fig. 3

PORTABLE PROCESSING DEVICE HAVING A MODEM SELECTIVELY COUPLED TO A RISC CORE OR A CISC CORE

CONTINUATION AND PRIORITY DATA

This application claims benefit of priority of U.S. provisional application Ser. No. 60/823,289 titled "Smart Phone" filed Aug. 23, 2006, whose inventor was Chi Chang.

FIELD OF THE INVENTION

This invention relates to mobile communications devices, and more particularly, to integrated circuits used in such devices.

DESCRIPTION OF THE RELATED ART

In recent years, the use of portable electronic devices has become extremely widespread and common. Commonly used portable electronic devices includes cellular telephones, personal digital assistants (PDA's), palmtop computers, and portable gameplaying devices. Furthermore, many portable electronic devices combine multiple features of the aforementioned devices into a single portable electronics device.

The design of portable electronic devices presents several significant challenges that are not present in the design of non-portable electronics. One of these design challenges is to minimize power consumption. A typical portable electronic device includes a rechargeable battery, and is configured for use with battery power. Because the amount of power of the battery between charges is limited, portable electronic devices are designed to be power efficient. An example of this is a backlight display on a cellular telephone, which may turn on when the user is dialing a phone number, answering a call, or so forth, but will turn off after several seconds of activity. This reduces unnecessary power consumption by the backlight and thus preserves battery lift.

Another significant challenge in designing portable electronic devices relates to the thermal characteristics of the circuitry within. The circuitry of a portable electronics device is typically enclosed in a very small space. Accordingly, cooling those circuits as well as minimizing the amount of heat they produce is a critical design factor. The challenge of minimizing the amount of heat produced often times coincides with the challenge of minimizing power consumption.

Yet another significant design challenge for portable electronic devices is functionality. The increasing sophistication of these devices has only fueled the demand for additional functionality, or the combining thereof into a single device. For example, it is desirable to incorporate as many functions as possible of a high-level operating system (e.g., Microsoft Windows™) into some portable electronic devices since their widespread may result in user familiarity. In another example, the prevalence of wireless networks coupled to the internet makes it desirable to incorporate email and web browsing functionality into portable electronic devices. However, the challenge of incorporating additional functionality is often times at odds with the challenge of minimizing power consumption and thermal output of the circuitry in an electronic device. Some portable electronic devices may be limited to a basic, embedded RISC (reduced instruction set computing) processor in order to limit power consumption, at the expense of functionality. Other electronic devices may implement both a RISC and a separate CISC (complex instruction set computing) in order to gain additional functionality, but this may come at a cost of greater power consumption and additional heat generation. Accordingly, designers of portable electronic devices are forced to balance the need for additional functionality with the need to minimize power consumption and thermal output, and must do so in a way that results in a device that is attractive to consumers.

SUMMARY OF THE INVENTION

A processor for a portable electronic device is disclosed. In one embodiment, the processor includes a RISC (reduced instruction set computing) core a CISC (complex instruction set computing) core, a video accelerator circuit and an audio accelerator circuit. Each of the video and audio accelerator circuits are coupled to both the RISC and CISC cores, with both cores and both accelerator circuit being incorporated into a single integrated circuit (IC). In a first plurality of operational modes, the RISC core is active, while the CISC core is in one of a sleep state or a power off state. In a second plurality of modes, both the RISC and CISC cores are active.

A portable electronic device is also disclosed. The portable electronic device includes a display, a keyboard, an audio output device, and a processor. The processor is coupled to each of the display, the keyboard, and the audio output device, and includes a RISC core, a CISC core, and audio and video accelerator circuits, all integrated into a single IC. The portable electronic device is configured to operate in a first plurality of modes and a second plurality of modes. In the first plurality of modes, the RISC core of the processor is active, while the CISC core is in one of a sleep state or a power off state. In the second plurality of modes, both the RISC core and the CISC core are active, although the CISC core may provide primary control of the device.

In various embodiments, the portable electronic device may also include a WLAN (wireless local area network) modem, a phone modem, a WI-MAX MAX (Worldwide Interoperability for Microwave Access) modem, and/or other means for communicating with the external world. In the first plurality of modes, the RISC core of the processor may execute instructions of a RISC operating system (ROS) and provide a man-machine interface (MMI) to the display. In the second plurality of modes, the CISC core may execute instructions of a high-level operating system (HLOS), such as Microsoft Windows™, and provide a graphical user interface (GUI) to the display. For both the first and second plurality of modes, audio and video processing is performed by the audio and video accelerator circuits, respectively.

BRIEF DESCRIPTION OF THE DRAWINGS

Other aspects of the invention will become apparent upon reading the following detailed description and upon reference to the accompanying drawings in which:

FIG. 3 is a table illustrating the various modes of operation of an embodiment of a portable electronic device that includes an embodiment of the processor illustrated in FIG. 2.

Figure 1:
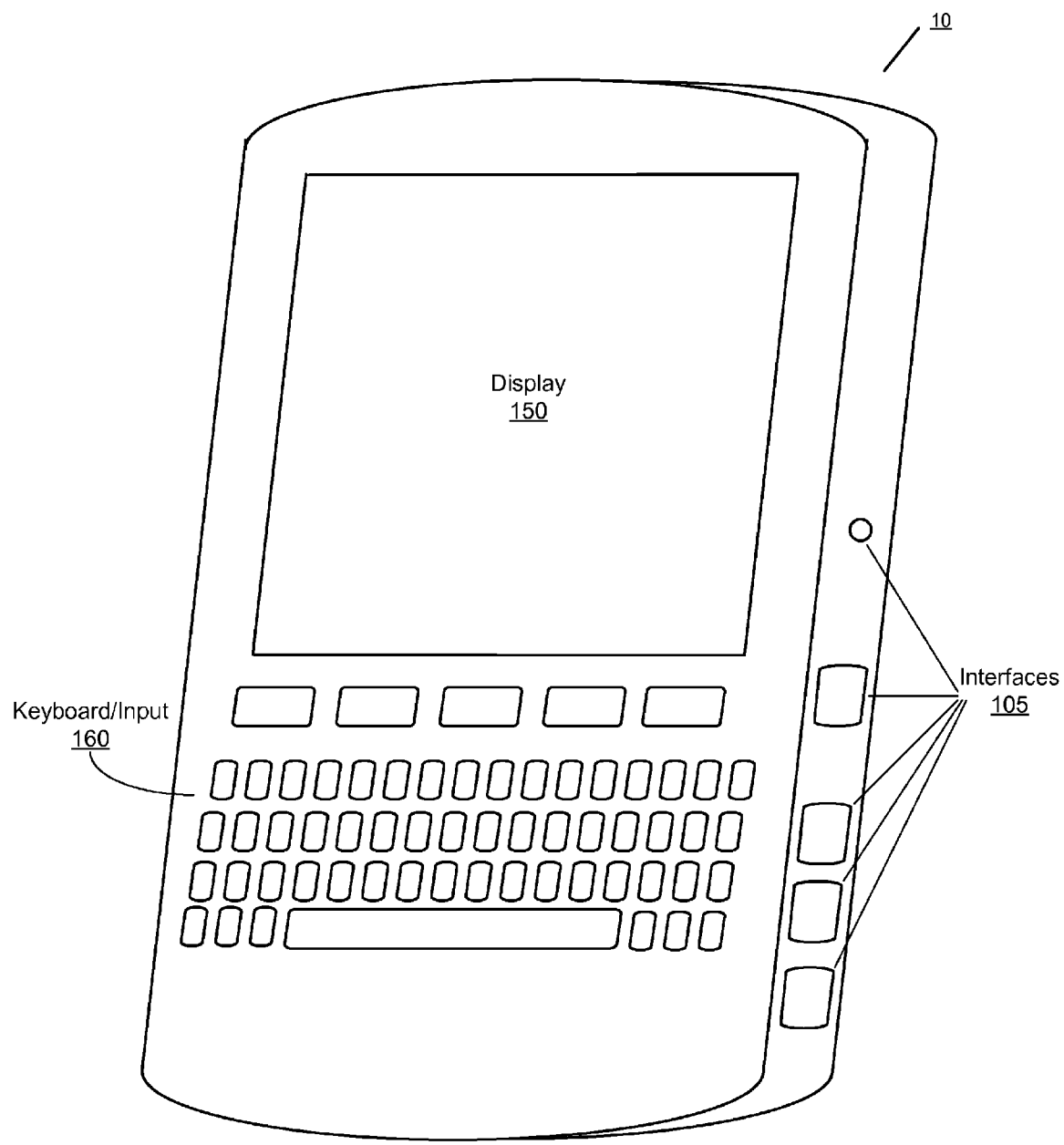
FIG. 1 is a drawing illustrating one embodiment of a portable electronic device.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE EMBODIMENTS

FIG. 1 is a drawing illustrating one embodiment of a portable electronic device. In the embodiment shown, portable electronic device 10 may be one of several different types of electronic devices, including devices such as personal digital assistants (PDA's) or palmtop computers. Portable electronic device may provide a wide variety of functions, including internet access, email, video playback, audio playback, mobile telephony, among others.

Portable electronic device 10 includes a display 150 for displaying information. Information may be entered by a user of portable electronic device 10 through keyboard/input 160, which may include a QWERTY keyboard as well as additional special function keys. Although not explicitly shown, some embodiments of keyboard/input 160 may also include input devices such as a track ball for manipulating the position of a pointer on display 150.

Portable electronic device 10 also includes a plurality of interfaces 105. Although shown here as being placed on the side of the unit, in other embodiments, interfaces 105 may be placed in any suitable location. The types of interfaces may include input jacks for audio input devices (e.g., microphone) or an integrated audio input device, speakers for audio output, connections for various devices such as digital cameras, interfaces for a phone and/or phone modem, WLAN connections (including transmitters and receivers), and so forth.

It should be noted that the embodiment of portable electronic device 10 shown in FIG. 1 is exemplary, and that many other embodiments are possible and contemplated. In general, various embodiments of the portable electronic device may be of different sizes, shapes, may have different input and output devices and interfaces. Accordingly, a wide variety of portable electronic devices may fall within the scope of this disclosure.

Figure 2:
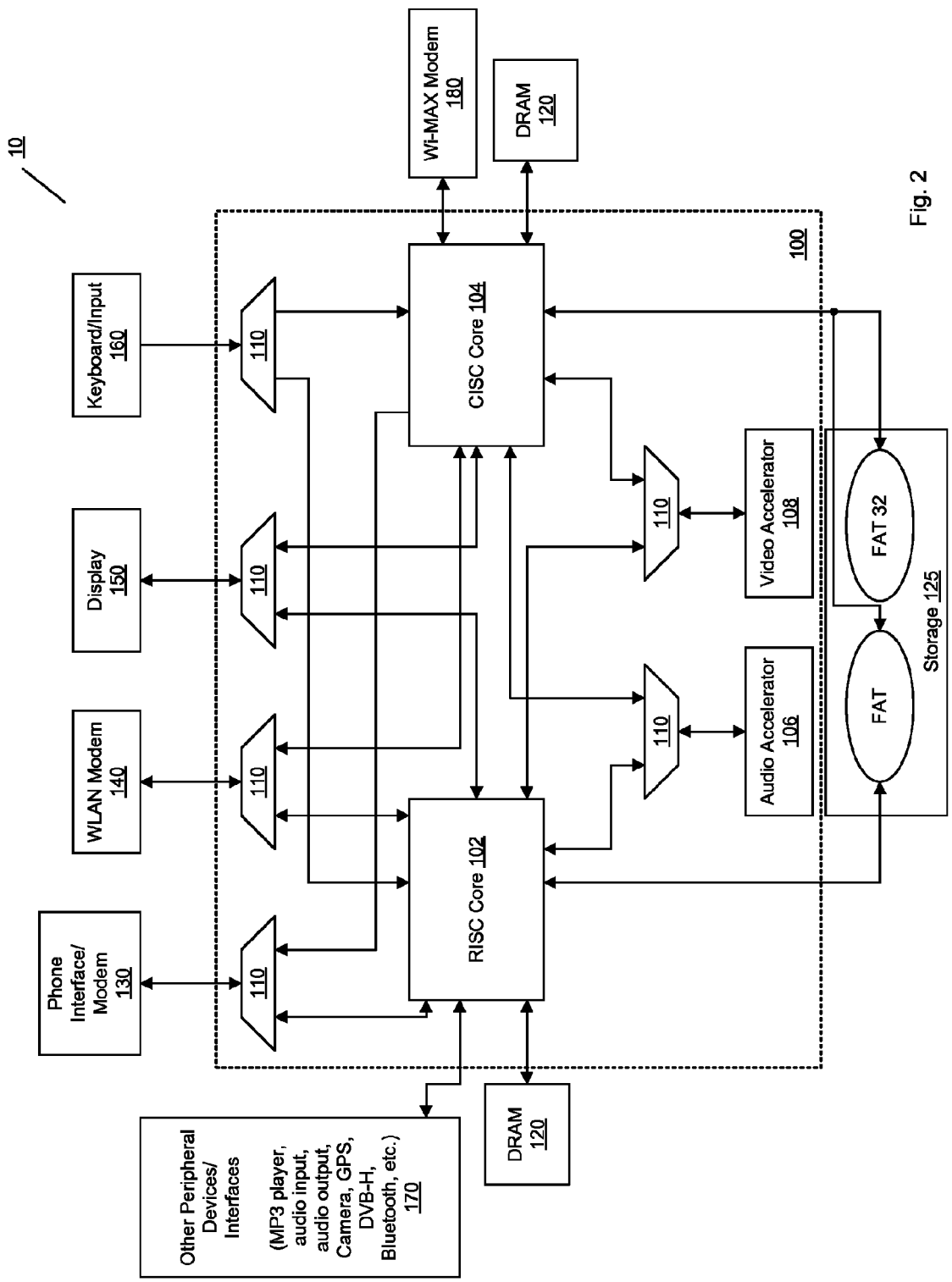
FIG. 2 is a block diagram of one embodiment of a portable electronic device.

Turning now to FIG. 2, a block diagram of one embodiment of a portable electronic device is shown. In the embodiment shown, portable electronic device 10 includes a processor 100 which will now be discussed in further detail.

Processor 100 includes a reduced instruction set computing (RISC) core 102 and a complex instruction set computing (CISC) core 104. RISC core 102 is configured to execute instructions from a RISC instruction set, which includes instructions that typically execute within one clock cycle. CISC core 104 is configured to execute instructions from a CISC instruction set, which includes instructions that typically require multiple clock cycles to execute. In a typical RISC instruction set, LOAD and STORE are separate instructions, while these instructions may be incorporated into other, more complex instructions in a CISC instruction set. In one embodiment, the CISC instruction set may comprise instructions from the x86 instruction set, while the RISC instruction set may be associated with an instruction set of the Advanced RISC Machine (ARM) architecture. However, other RISC and CISC instruction sets are possible and contemplated.

Processor 100 further includes an audio accelerator 106 and a video accelerator 108. Audio accelerator 106 may execute instructions associated with audio functions, and thus allows the workload associated with these functions to be offloaded from RISC core 102 and CISC core 104. Similarly, video accelerator 108 is configured to execute instructions associated with video functions, thereby allowing the workload associated with video processing to be offloaded from RISC core 102 and CISC core 104. Depending on the mode in which processor 100 is operating, the audio and video accelerators may be selectively coupled to one of RISC core 102 or CISC core 104 via the associated selection circuits 110. The selection circuit 110 associated with audio accelerator 106 may be referred to as an audio selection circuit, and may couple one of RISC core 102 or CISC core 104 to the audio accelerator. Similarly, the selection circuit 110 associated with video accelerator 108 may be referred to as a video selection circuit, and may couple one of RISC core 102 or CISC core 104 to the video accelerator. It should be noted that when coupled to RISC core 102 or CISC core 104, communications with audio accelerator 106 and video accelerator 108 are bi-directional.

In the embodiment shown, each of RISC core 102, CISC core 104, audio accelerator 106 and video accelerator 108 are implemented on a single integrated circuit. Additionally, the selection circuits 110 associated with audio accelerator 106 and video accelerator 108 are also implemented on the same integrated circuit. Additional selection circuits 110 for coupling one of RISC core 102 or CISC core 104 to other off-chip devices may also be implemented on the same integrated circuit, the functional boundaries of which for this particular embodiment being defined by the dashed line in FIG. 2.

In various modes of operation, RISC core 102 and CISC core 104 may be active or inactive. In a first plurality of operational modes, RISC core 102 may be active, while CISC core 104 may be inactive. CISC core 104 may be in one of either a sleep state or a power off state when inactive. This may provide power savings by operating only the RISC core 102 when functions requiring CISC core 104 are not being utilized.

In a second plurality of operational modes, both RISC core 102 and CISC core 104 may be active. Additional details regarding the first and second pluralities of operational modes will be discussed in further detail below with reference to FIG. 3.

Portable electronic device 10 also includes at least one dynamic random access memory (DRAM) 120. In the embodiment shown, a first DRAM 120 is coupled to RISC core 102, while a second DRAM 120 is coupled to CISC core 104. The first and second DRAMs 120 shown here may be separate from each other, either physically or functionally. Embodiments are possible and contemplated wherein DRAMs 120 are part of the same physical bank (or other unit) of memory, but are separately addressable by either RISC core 102 or CISC core 104. Embodiments are also possible and contemplated wherein a single DRAM is shared and fully addressable by both RISC core 102 and CISC core 104.

Both RISC core 102 and CISC core 104 are coupled to a storage unit 125. Storage unit 125 may be a hard disk drive or other type of non-volatile storage medium. Information stored in storage unit 125 may be stored in one of two different file systems, a file allocation table (FAT) file system, or a FAT 32 file system (i.e. a file allocation table system with 32-bit addressing). RISC core 102 is coupled to storage unit 125 such that it can access (i.e., read or write) files stored in the FAT file system. CISC core 104 is coupled to access files from both the FAT file system and the FAT 32 file system.

Both RISC core 102 and CISC core 104 may be coupled to various peripheral devices as well. These various devices may be synonymous with interfaces 105 discussed in reference to FIG. 1, as each may provide input, output, or both. These peripheral devices may be integrated into portable electronic device 10 or, alternatively, portable electronic device 10 may be configured for coupling to these peripheral devices.

In the embodiment shown, portable electronic device 10 includes a phone interface/modem 130. This interface may provide the ability to couple to a telephone line for internet connectivity via a telephone modem. Alternatively, phone interface/modem 130 may connect to the internet via a digital subscriber line (DSL) connection through a telephone line. In addition to providing internet connectivity to portable electronic device 10, phone interface/modem 130 may also provide voice phone and image phone functionality. A selection circuit 110 may couple phone interface/modem 130 to RISC core 102 or CISC core 104, depending on the specific mode of operation.

Portable electronic device 10 also includes a wireless local area network (WLAN) modem 140 in the embodiment shown. WLAN modem 140 is configured to allow portable electronic device 10 to be wirelessly coupled to a local area network. This may include connecting to a network through a wireless router in a home or work environment as well as connecting to a network via a public wireless "hot spot". WLAN 140 may be coupled to either RISC core 102 or CISC core 104 depending on the particular mode of operation, via the associated selection circuit 110.

As previously noted, portable electronic device 10 includes a display 150. When portable electronic device 10 is operating in one of a first plurality of modes, RISC core 102 is coupled to display 150 by the associated selection circuit 110. When operating in one of a second plurality of modes, CISC core 104 is coupled to display 150 by the associated selection circuit 110. It should also be noted that video accelerator 108 may be coupled (via the associated selection circuit 110) to RISC core 102 when operating in one of a first plurality of modes and coupled to CISC core 104 when operating in one of a second plurality of modes. Thus, video accelerator 108 may provide video processing functions for the processor core that is coupled to display 150 for a given operational mode.

When operating in one of the first plurality of operational modes, RISC core 102 may be coupled to output information to display 150 in accordance with a man-machine interface (MMI). Man-machine interfaces are and used in various devices such as cell phones and personal digital assistants. The particulars of the MMI used may vary with the different embodiments of portable electronic device 10. The MMI may be driven by a RISC operating system (ROS) that executes on RISC core 102 during operation in one of the first plurality of operational modes.

When operating in one of the second plurality of operational modes, CISC core 104 maybe coupled to output information to display 150 in accordance with a graphical user interface (GUI). GUI's are used with many different operating systems, such as Microsoft Windows™. The GUI may be driven by an associated operating system that executes on CISC core 104. In addition to displaying information to a user of portable electronic device 10, the GUI may allow a user to enter information into the device through the display (e.g., through a pointing device, a "pen", or other means).

The particular operating system executed by CISC core 104 may be a simplified version of one that is typically used with desktop or laptop computers (e.g., Microsoft Windows™ as noted above). The simplified version of the operating system may include much of the same basic functionality as a desktop or laptop version, but may eliminate some components that are not suitable for use with a portable electronic device.

Portable electronic device 10 also includes a keyboard/input 160 as previously discussed. When operating in one of the first plurality of modes, keyboard/input 160 is coupled to RISC core 102 via the associated selection circuit. When operating in one of the second plurality of operational modes, keyboard 160 is coupled to CISC core 104 via the associated selection circuit 110.

In the embodiment shown, CISC core 104 is coupled to a WI-MAX (Worldwide Operability for Microwave Access) modem 180. WI-MAX modem 180 may be used to couple portable electronic device 10 to a network via a wireless network hotspot, or may also provide a wireless alternative to cable and/or DSL for "last mile" broadband network access. Since WI-MAX modem 180 is coupled only to CISC core 104 in the embodiment shown, it is not available for use during operation in any of the first plurality of operational modes.

In addition to the various other peripherals and interfaces discussed above, portable electronic device 10 may include a number of additional peripheral devices and/or interfaces, shown here as item 170. Among these devices/interfaces may be included an .mp3 player, other audio inputs and outputs, a camera interface, a GPS unit or interface thereto, an interface for digital video broadcast for handheld devices (DVB-H), a Bluetooth® interface, and so on. In general, a wide variety of peripheral devices and/or interfaces thereto are possible and contemplated for use with various embodiments of portable electronic device 10, and these peripheral devices/interfaces are not limited to those explicitly discussed herein.

Turning now to FIG. 3, a table illustrating the various modes of operation of an embodiment of a portable electronic device is shown. The embodiment of the portable electronic device to which FIG. 3 applies includes an embodiment of the processor discussed in reference to FIG. 2.

The embodiment of the portable electronic device to which FIG. 3 refers may operate in one of a first plurality of modes or one of a second plurality of modes. The first and second pluralities of operational modes may clearly be distinguished from each other by which core of the processor has control of the display and the keyboard. As seen in the far right column of FIG. 3, in a first plurality of modes, the RISC core of the processor is coupled to and has control of the keyboard and display. During operation in one of the first plurality of modes, an MMI interface appears on the display, while any input from the keyboard or associated input devices (e.g., a track ball) is provided to the RISC core. During operating in one of the second plurality of modes, a GUI appears on the display, while any input from the keyboard or associated input devices is provided to the CISC core.

During operation in each of the first plurality of modes, the CISC core is either off or in a sleep state, as indicated by the middle column. During operation in each of the second plurality of modes, the CISC core is on, although the CISC core may go into a sleep mode after a predetermined time of inactivity. For the embodiment to which FIG. 3 refers, the RISC core may be on during all of the first and second pluralities of operation modes, although other embodiments are possible and contemplated wherein the RISC core is off or in a sleep state when operating in one of the second plurality of modes.

During operation in the second plurality of modes, both the audio and video accelerators are on and coupled to the CISC core. During operation in the first plurality of modes, the audio and video accelerators may each be on or off, depending on the particular mode. Regardless of whether the audio and video accelerators are on or off in the first plurality of modes, their respective selection circuits will be set to couple them to the RISC core.

The first plurality of operational modes may include modes such as standby, voice phone, image phone, the playing of .mp3 files, GPS functionality, and others listed in FIG. 3.

The second plurality of operational modes may include modes such as phone or WLAN internet/email through the CISC core, WI-MAX connectivity, and running of various applications requiring the operating system that executes on the CISC core (e.g., the word processor and spreadsheet applications listed, among others). Embodiments of a portable electronic device having different and/or additional modes of operation are possible and contemplated. Additional modes may be determined in accordance with different peripheral devices or interfaces thereto that are contemplated but not explicitly discussed herein. A determination of whether or not any additional mode is one of the first or second pluralities may be made in accordance with which processor core—the RISC core or the CISC core—controls the display and keyboard during operation therein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

I claim:

1. A processor for a portable electronic device, the processor comprising:
    a RISC (reduced instruction set computing) core;
    a CISC (complex instruction set computing) core;
    a video accelerator circuit coupled to both the RISC core and the CISC core; and
    an audio accelerator circuit coupled to both the RISC core and the CISC core;
    a WLAN (wireless local area network) selection circuit, wherein when operating in one of a first plurality of modes, the WLAN selection circuit is configured to enable the RISC core to be coupled to a WLAN modem, and wherein, during operation in one of a second plurality of modes, the WLAN selection circuit is configured to enable the CISC core to be coupled to the WLAN modem exclusive of the RISC core;
    wherein the RISC core, the CISC core, the video accelerator circuit, and the audio accelerator circuit are incorporated into a single integrated circuit;
    wherein, in the first plurality of operational modes, the RISC core is active and the CISC core is inactive; and
    wherein, in the second plurality of operational modes, the CISC core and the RISC core are both active.

2. The processor as recited in claim 1 further comprising a video selection circuit, wherein the video selection circuit is configured to couple the RISC core to the video accelerator circuit when operating in the first plurality of modes and the CISC core to the video accelerator circuit when operating in the second plurality of modes.

3. The processor as recited in claim 1, further comprising a display selection circuit, wherein the display selection circuit is configured to enable the RISC portion to be coupled to a display when operating in the first plurality of modes, and wherein the display selection circuit is configured to enable the CISC portion to be coupled to the display when operating in the second plurality of modes.

4. The processor as recited in claim 1, further comprising an audio selection circuit, wherein the audio selection circuit is configured to couple the RISC core to the audio accelerator when operating in the first plurality of modes and the CISC core to the audio accelerator when operating in the second plurality of modes.

5. The processor as recited in claim 1, wherein the RISC core is configured for coupling to a first RAM (random access memory) and the CISC core is configured for coupling to a second RAM separate from the first RAM.

6. The processor as recited in claim 1, wherein the RISC core is configured to be coupled to a FAT (File Allocation Table) storage system, and wherein the CISC core is configured to be coupled to the FAT storage system and a FAT-32 (FAT32 bit) storage system.

7. The processor as recited in claim 1 further comprising a phone modem selection circuit, wherein in the first plurality of modes, the phone modem selection circuit is configured to enable the RISC core to be coupled to the phone modem, and wherein, during the second plurality of modes, the phone modem selection circuit is configured to enable the CISC core to be coupled to the phone modem selection circuit.

8. The processor as recited in claim 1, wherein the CISC core is configured to be coupled to a WI-MAX (Worldwide Interoperability for Microwave Access) modem.

9. The processor as recited in claim 1, wherein in the first plurality of modes, the RISC core is configured to provide output for a man-machine interface (MMI) display, and wherein during the second plurality of modes, the CISC core is configured to provide output for a graphical user interface (GUI) of an operating system.

10. The processor as recited in claim 1, wherein the CISC core is in one of a sleep state or a power off state when inactive.

11. A portable electronic device comprising:
    a display;
    a keyboard;
    an audio output device; and
    a processor coupled to the display, the keyboard, and the audio output device,
        wherein the processor includes:
        a RISC (reduced instruction set computing) core;
        a CISC (complex instruction set computing) core;
        a video accelerator circuit coupled to both the RISC core and the CISC core; and
        an audio accelerator circuit coupled to both the RISC core and the CISC core;
        wherein the RISC core, the CISC core, the video accelerator, and the audio accelerator are incorporated into a single integrated circuit;
    wherein the portable electronic device is configured to operate in one of either a first plurality of operational modes ore in a second plurality of operational modes;
    wherein, in the first plurality of modes, the RISC core is active and the CISC core is inactive, and wherein, in the second plurality of modes, the CISC core and the RISC core are both active; and
    wherein the portable electronic device further includes a WLAN (wireless local area network) modem, wherein during operation in one of the first plurality of modes, a WLAN selection circuit of the processor is configured to couple the RISC core to the WLAN modem, and wherein during operation in one of the second plurality of modes, the WLAN selection circuit is configured to couple the CISC core to the WLAN modem exclusive of the RISC core.

12. The portable electronic device as recited in claim 11, wherein a display selection circuit in the processor is configured to couple the RISC portion to the display when the operating in the first plurality of modes, and wherein the display selection circuit is configured to couple the CISC portion to the display when operating in the second plurality of modes.

13. The portable electronic device as recited in claim 11, wherein the processor includes a video selection circuit, wherein the video selection circuit is configured to couple the RISC core to the video accelerator circuit when operating in the first plurality of modes and the CISC core to the video accelerator circuit when operating in the second plurality of modes.

14. The portable electronic device as recited in claim 11, wherein the processor includes an audio selection circuit, wherein the audio selection circuit is configured to couple the RISC core to the audio accelerator when operating in the first plurality of modes and the CISC core to the audio accelerator circuit when operating in the second plurality of modes, and wherein the processor is configured to provide audio output signals from the audio accelerator circuit to the audio output device.

15. The portable electronic device as recited in claim 11, wherein the portable electronic device includes a first RAM (random access memory) and a second RAM separate from the first RAM, wherein the RISC core is coupled to the first RAM and the CISC core is coupled to the second RAM.

16. The portable electronic device as recited in claim 11, wherein the portable electronic device includes a FAT (file allocation table) storage system and a FAT32 (FAT 32-bit) storage system, wherein the RISC core is coupled to the FAT storage system and the CISC core is coupled to the FAT storage system and the FAT-32 storage system.

17. The portable electronic device as recited in claim 11, wherein the portable electronic device includes a phone modem, and wherein during the first plurality of modes, a phone modem selection circuit of the processor is configured to couple the RISC core to the phone modem, and wherein during the second plurality of modes, the phone modem selection circuit is configured to couple the CISC core to the phone modem.

18. The portable electronic device as recited in claim 11, wherein the portable electronic device includes a WI-MAX MAX (Worldwide Interoperability for Microwave Access) modem, and wherein the CISC core is coupled to the WIMAX modem.

19. The portable electronic device as recited in claim 11, wherein in the first plurality of modes, the display is configured to display a man-machine interface (MMI), and, wherein, during the second plurality of modes, the display is configured to display a graphical user interface (GUI) for an operating system.

* * * * *